Oct. 8, 1963  V. J. PHILIPPS  3,106,383
LIQUID CIRCULATORS

Filed April 1, 1960  2 Sheets-Sheet 1

INVENTOR
VIRGIL JOHN PHILIPPS
BY
ATTORNEY

Oct. 8, 1963 V. J. PHILIPPS 3,106,383
LIQUID CIRCULATORS
Filed April 1, 1960 2 Sheets-Sheet 2
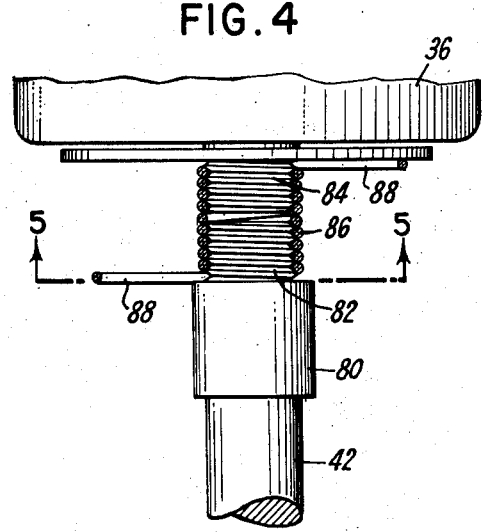
FIG. 4
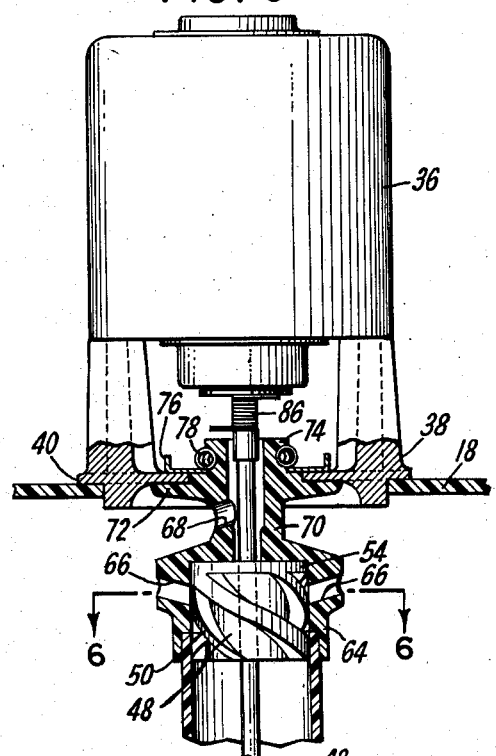
FIG. 3
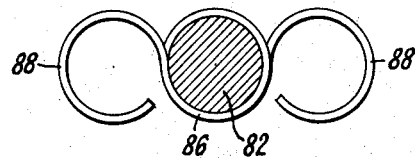
FIG. 5
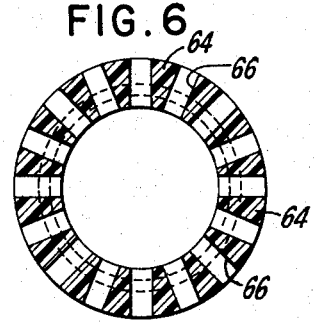
FIG. 6
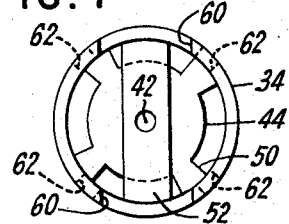
FIG. 7
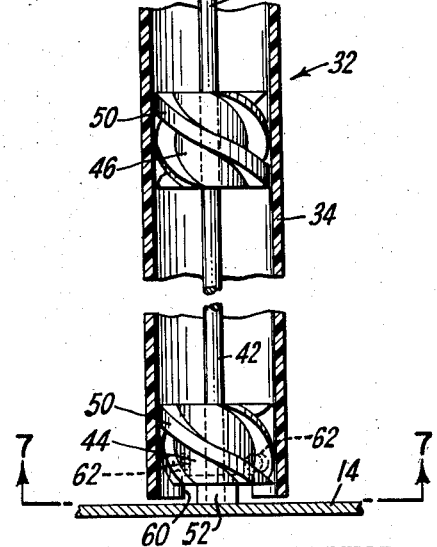
INVENTOR
VIRGIL JOHN PHILIPPS
BY
ATTORNEY

United States Patent Office 3,106,383
Patented Oct. 8, 1963

3,106,383
LIQUID CIRCULATORS
Virgil John Philipps, Chicago, Ill., assignor to American Machine & Foundry Company, a corporation of New Jersey
Filed Apr. 1, 1960, Ser. No. 19,321
4 Claims. (Cl. 259—97)

The present invention relates to liquid circulators and in particular to apparatus for circulating liquids such as fruit juices, fruit drinks, coffee or other types of beverages in automatic or semi-automatic dispenser.

The present invention is particularly adapted for use in counter top refrigerated beverage dispensers of the non-carbonated type and will be described in connection therewith. It will be understood, however, that the present invention has wider application and can be used in any type of beverage dispenser either heated or refrigerated, carbonated or non-carbonated and of whatever capacity.

In beverage dispensers of the type described, the refrigeration apparatus includes a cooling coil or plate extending into the lower portion of a bowl or reservoir in which the beverage is stored. The bowl or reservoir is preferably made of glass or plastic and is transparent, to provide a clean and sanitary storage receptacle. Furthermore, the transparency of the bowl affords the operator of the dispenser, or the general public, a view of the type and amount of beverage contained therein and aids in the sale of the beverage.

In order to prevent any stagnation of the liquid in the bowl, or the separation of the pulp and sediment from the liquid or in order to prevent portions of the beverage from drying and clinging to the sides of the bowl or receptacle, it is necessary to constantly keep the liquid agitated. Agitation is also necessary to insure that the beverage moves over or through the refrigerating coils or plate so that the effect of cooling is distributed evenly throughout the liquid. Agitation of the liquid also enhances the appearance of the beverage and contributes to its advertising value by preserving the fresh appearance of the beverage.

While manual agitation can of course be made, it is most desirous to effect agitation and circulation continuously and automatically. Thus it has been common to automatically produce agitation by the circulation of the beverage through conventional type centrifugal pump means. However, this has proven to be unsatisfactory. This is because such means have been located adjacent to and often in association with the refrigerating apparatus, both being housed within a common cabinet with the liquid being withdrawn from the lower portions of the bowl or receptacle and pumped back at some remote location. Being physically beneath the bowl and in contact with the beverage, these pumps have had to be protected by extensive and expensive sealing means since the citric acids of fruit beverages and other acids of beverages, such as, coffee or tea, are very corrosive. Furthermore, the pulp and sediment of the fruit beverages separate out and quite easily tend to clog the operating mechanism of the pumps.

In order to avoid repeated breakdowns of the present types of dispenser, and in particular the pump, their cleanliness and maintenance must be highly controlled. That is, both dispenser and pump must be cleaned often to remove acid deposits and to prevent corrosive action and the seal constantly tested and changed in order to prevent any leakage. Nevertheless, and even though these precautions are taken, pumps are known to break down quite often. When this occurs, the beverage dispenser, as a whole, is rendered out of commission since the pumps being in association with the refrigerating means and being mounted in the same cabinet can not be removed without the dismantling of the dispenser. Costly repairs and excessive labor is often required to correct the situation. The cost of repair and the loss of business due to the inoperation of the dispenser are a heavy burden upon the dispenser operator who usually sells the beverage at only a small profit.

An attempt has been made to overcome these problems by the use of a centrifugal type pump driven by remote motor means through a magnetic coupling. Such an attempt avoids the use of seals between the pump and the motor, minimizing the corrosive results of the liquid. This method, however, is not satisfactory in practice since it requires critical adjustment of the motor mounting to insure a proper magnetic field. Furthermore, such apparatus does not lend itself easily to the handling of pulp products. Any build up of pulp products on the pump impeller causes excessive loading and failure of the magnetic coupling. Also, as with the use of conventional types of centrifugal type pumps, this apparatus also requires constant cleaning, repair and maintenance in order to insure continued satisfactory operation of the beverage dispenser.

It is therefore the main object of the present invention to provide an apparatus for circulating the liquid in an automatic or semi-automatic beverage dispenser free of the difficulties outlined above.

It is a further object of the present invention to provide liquid circulating means suitable for use with fruit juices, drinks and other beverages which have long trouble-free life. It is another object of the present invention to provide a liquid circulator which can be easily cleaned and replaced by unskilled help. Another object of the present invention is to provide a liquid circulator for beverage dispensers which does not require critical adjustment and is not dependent upon complete sealing for trouble-free operation.

The enumerated objects are as well as other objects obtained by the present invention wherein there is provided, amongst other things, a circulator for a beverage dispenser of the type described having a liquid storage reservoir, comprising an elongated cylindrical tube extending substantially vertically within the reservoir, a motor driven impeller assembly located within the tube and adapted to lift the liquid from the reservoir through the tube, the tube having a series of radially spaced holes located adjacent its upper and whereby the liquid is impelled outwardly of the tube and returned to the reservoir.

In the following description reference is made to the accompanying drawings in which:

FIG. 1 is a perspective view of a beverage dispenser illustrating the beverage circulator, FIG. 2 is a perspective view of the impeller housing mounting mechanism, FIG. 3 is a sectional side elevation of the impeller housing in conjunction with the impeller mechanism, FIG. 4 is an enlarged sectional side elevation of the impeller drive shaft coupling, FIG. 5 is a sectional end elevation of the impeller drive shaft coupling taken on line 5—5 of FIG. 4.

FIG. 6 is a sectional end elevation of the circulator spray head with the impeller removed taken on line 6—6 of FIG. 3.

FIG. 7 is an end elevation of the bottom impeller in conjunction with the impeller housing, taken on line 7—7 of FIG. 3.

Figure 1:
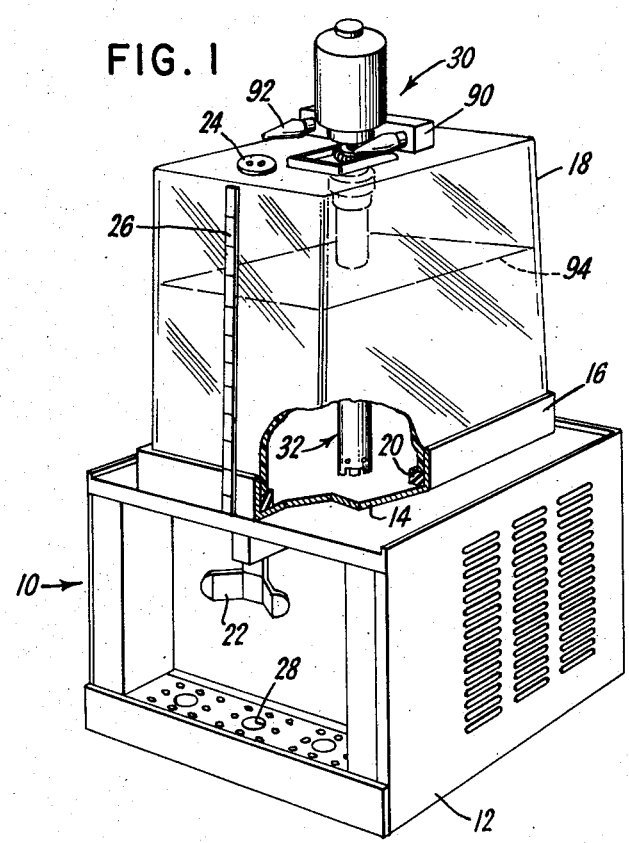

In FIG. 1 of the drawings there will be seen a beverage dispenser 10 comprising a lower cabinet housing 12 containing a hermetically sealed refrigeration system including a cold plate 14. The refrigerating apparatus is of the type common to the art and therefore not further described in detail in this description since it is unnecessary for the understanding of the present invention. A rectangular flange member 16 extends upwardly from the top of the cabinet 12 and surrounds the cold plate 14. A Lucite bowl 18, injection molded having four sides, a top and no bottom is fitted into the flange 16 over the cold plate 14, forming therewith a beverage reservoir. A detachable rubber channel gasket 20 is fastened around the bottom edges of the bowl 18 forming an effective seal between the bowl 18 and the flange 16.

A spigot 22 having a conventional spring actuated valve is provided for the withdrawal of the beverage. A vented fill cover 24 easily removable is provided at the top of the bowl 18 for the easy filling thereof.

Additional refinements such as a gage 26 and drip pan 28 are also provided as can any number of additional features not described here since the beverage dispenser is of the type quite common in the art. It is described only as an environment for the present invention and it is to be understood that the present invention is not limited in application to the type of dispenser herein shown.

Figure 2:
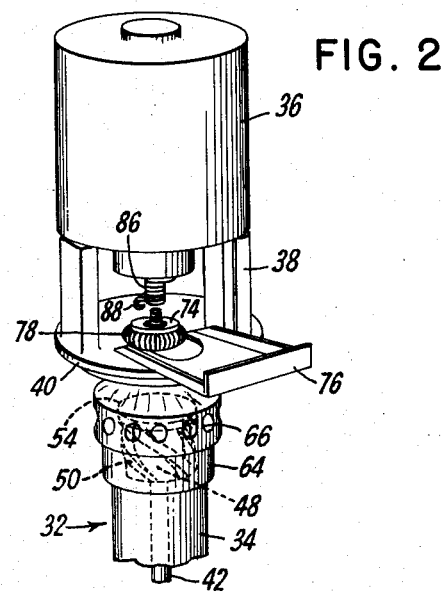

The circulator of the present invention is shown generally at 30 in FIG. 1 and is shown in greater detail in FIG. 2. The circulator comprises an impeller assembly 32 located in a cylindrical tubular body 34, and coupled to a fractional horsepower motor 36. The motor 36 is mounted on a bracket 38 in a conventional manner. The bracket 38 has an annular flange 40 which forms a cover plate permitting the motor to rest upon the top of bowl 18 with the impeller assembly 32 and tube 34 extending within the reservoir through an aperture located centrally in the top of the bowl 18. The tube 34 is of sufficient length so that it extends substantially through the bowl 18 to a point adjacent to but spaced from the cold plate 14. The end of the impeller assembly 32 is slightly longer extending to a position barely spaced from the cold plate.

The impeller assembly 32 is formed of an elongated rod 42 having three impeller units 44, 46, and 48. The units 44, 46, and 48 are formed in the shape of a truncated helical screw having flutes or threads 50 of a diameter barely smaller than the inner diameter of the tube 34. The lower impeller unit 44 is formed with a rectangular block ridge protrusion 52 extending below the bottom end of the tube 34 adjacent the cold plate 14. The upper impeller 48 is formed with a flat circular flange 54 having a diameter equal, at least, to the diameter of the flutes 50. The function of both the protrusion 52 and flange 54 will be described in detail later in the description.

The cylindrical tube 34, preferably made out of Lucite although glass or other similar material can be used, has a cut out lower portion 60 and a series of holes 62 formed adjacent thereto. A hollow spray head 64 is formed on the upper end of the tube 34 and contains a series of holes 66 extending radially outwardly of the head 64 and in annular array. The upper impeller unit 48 extends within the spray head so that the upper flange 54 is positioned above the annular series of holes 66.

The spray head 64 is provided with a neck portion 70 widening into a shoulder 72 and then decreasing into a stepped down annular neck portion 74 having a concave groove formed therein. The spray head 64 and tube 34 is clamped to the motor bracket 38 in the manner shown in FIG. 3 by placing the stepped down annular portion 74 through a central aperture located in the flange 40 so that the collar 72 abuts the under face of plate or flange 40. A retaining clip 76 having a U shaped opening is slidably placed between the upper face of the plate 40 and the annular step down portion 74 which is supplied with a compression spring 78. The compression spring 78 locks the clip 76 securely in place between it and the plate 40 and prevents the tube 34 and spray head 64 from being removed from the bracket 40.

The neck 70 of the spray head 64 is provided with a drain hole 68, the purpose of which is described later.

The impeller assembly 32 is coupled to the motor in a manner shown in FIG. 4. The rod 42 extends beyond the upper impeller 48 and terminates in a collar 80 and threaded portion 82 substantially adjacent to the motor shaft 84 which is also threaded. A coupling 86 comprising a compression spring tightly wound into a helical coil is screwed at its respective ends to the rod 42 and shaft 84. The winding of the coupling 86 and of the threaded portions of rod 42 and shaft 84 is made in a manner so as to provide an action such that if the impeller 42 or motor shaft 84 are turned separately the coupling winds tighter about the unturned member, somewhat in the manner of the well known "Chinese Locking Puzzle Device." Thus an effective, but flexible coupling is formed between the motor 84 shaft and the impeller rod 42.

The coupling 86 is provided with a loop 88 at each end which when held manually in a stationary position will permit the unwinding of either the rod 42 or shaft 84 therefrom.

The bracket 38 has attached to it a circuit box 90 containing the necessary electrical circuitry and switches required for the operation of the circulator. In addition lamps 92 are mounted on the bracket providing light for the interior of the bowl. If desired, suitable advertising material can be placed over the circulator, the motor and the lamps, to aid in the vending of the beverage and in hiding it from public view.

As to the operation of the circulator: The circulator is inserted into the bowl 18 in the manner shown and previously described and the bowl filled with a beverage 94. The motor 36 is turned on and the impeller assembly 32 caused to rotate by the transmission of torque through spring coupling 86. The helical fluted configuration of impellers 44, 46 and 48 lift the beverage through the tube 34 to the spray head 64. The three impeller units 44, 46 and 48 tend to accelerate the velocity of the beverage 94 as it is lifted in the tube and by the time it reaches the spray head 64 it has a velocity such that it is forced out of the radial holes 66 at an angle substantially 90° to the axis of the tube or impeller assembly. The flange 54 on the upper face of the impeller 48 prevents the beverage from rising above the spray head, eliminating thereby any interference with the coupling of the impeller unit with the motor. In the event any liquid or air is forced above the flange 54 by the build up of excessive pressure within tube 34, it will drain or vent out of hole 68. Extensive sealing means between the motor and the impeller unit is therefore unnecessary.

The flange 54 also helps to divert the liquid 94 through the radial holes 66. As the liquid is forced out of the radial holes 66, it travels along the inner face of the top and down the sides of the bowl creating a washing action within the bowl. This prevents the accumulation of dried beverage within the bowl 18 and eliminates the unsightly ring associated with beverage dispensers.

The liquid 94 is drawn upwardly into the tube 34 through the cut out portion 60 and the holes 62 located at the lower portion of the tube. The protrusion 52 extending from the lower impeller 44 acts to mechanically agitate the liquid over the cold plate and keep all of the beverage in the bowl in a constant state of movement.

From the description of the structure of the circulator, it will be seen that a neat compact unitary apparatus is provided which can be easily inserted and removed from the bowl of a beverage dispenser. In the event repair or cleaning is necessary, the circulator can be easily dismantled without even the aid of a screw driver, by simply dismantling the couplings connecting the spray head 64 to the bracket 90 and the impeller unit to the motor.

From a description of the operation of the circulator, it will be seen that there is provided an apparatus by which the beverage in a dispenser is thoroughly circulated and agitated and in which extensive sealing means are not required. It will also be seen that the circulator is free of the difficulties found in the circulator of the prior art.

What I claim is:

1. In a beverage dispenser or the like having a reservoir for the storage of a quantity of liquid, a circulator comprising an elongated tubular body mounted in conjunction with said reservoir and extending substantially vertically into said liquid, said body being open at least at its bottom end and having a series of spaced radial holes adjacent its upper end, rotatable impeller means located within said body comprising an elongated rod and a helical screw member secured thereon, said screw member being formed with an annular flange at its upper edge and being positioned on said rod so as to have a portion thereof located substantially on a level with said radial holes and said flange located above said radial holes, and motor means for continuously rotating said impeller means to continuously lift a portion of said liquid to said annular flange and impel the same radially outward of said body through said spaced holes.

2. In a beverage dispenser or the like having a reservoir for the storage of a quantity of liquid, a circulator comprising an elongated tubular body mounted in conjunction with said reservoir and extending substantially vertically into said liquid, said body being open at least at its bottom end and having a series of spaced radial holes adjacent its upper end, an impeller assembly located in said body comprising a rotatable rod having attached at each end thereto and at a point intermediate of the ends a truncated helical screw member having a diameter substantially equal to the inner diameter of the tubular body and motor means for rotating said impeller assembly to continuously lift and accelerate a portion of said liquid through said body, the upper screw member being formed with circular flange along its upper edge substantially equal in diameter to the inner diameter of the tubular body and being positioned on said rod so that it is substantially at a level with said radial holes with said flange above said radial holes whereby said liquid is prevented from rising above said flange and is diverted forcibly outwardly by the upper screw member through said spaced radial holes.

3. In a beverage dispenser or the like having a reservoir for the storage of a quantity of liquid, a circulator comprising an elongated tubular body mounted in conjunction with said reservoir and extending substantially vertically into said liquid, a substantially hollow spray head mounted at the upper end of said tubular body, said spray head being formed with vertical walls having a plurality of spaced radial holes formed therein and an impeller assembly located in said housing comprising an elongated rod extending outwardly through said spray head, helical screw members secured on said rod at at least its upper and lower ends and motor means mounted on said reservoir and connected to said rod for rotating said rod to continuously lift a portion of said liquid through said housing, the upper screw member being formed with an annular flange and being positioned on said rod so as to be located within said spray head, the annular flange being located above the level of said radial holes whereby said liquid is prevented from rising above said flange and is forcibly diverted outwardly through said spaced radial holes.

4. The invention, according to claim 3, wherein said motor means has a threaded output shaft and said rod has a threaded portion extending outwardly of the spray head and includes manually releasable coupling means for connecting said shaft and said rod, comprising a tightly wound helical spring adapted to be screwed onto said shaft and rod, said spring being formed with a protruding member at each end which when held stationary permits the unwinding of either shaft or rod therefrom.

References Cited in the file of this patent

UNITED STATES PATENTS

| 631,072 | Grosse | Aug. 15, 1899 |
| 664,130 | Culmann et al. | Dec. 18, 1900 |
| 1,911,644 | Overbury | May 30, 1933 |
| 1,933,346 | Schwentker | Oct. 31, 1933 |

FOREIGN PATENTS

| 633,260 | Great Britain | Dec. 12, 1949 |